(12) United States Patent
Faigle et al.

(10) Patent No.: US 6,394,489 B1
(45) Date of Patent: May 28, 2002

(54) STEERING WHEEL AIR BAG MODULE

(75) Inventors: Ernst M. Faigle, Dryden, MI (US); Alexander Heilig, Waldstetten (DE)

(73) Assignees: TRW Vehicle Safety Systems Inc., Lyndhurst, OH (US); TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/599,932

(22) Filed: Jun. 22, 2000

(51) Int. Cl.⁷ ............................ B60R 21/20; B60R 21/22
(52) U.S. Cl. ........................................................ 280/731
(58) Field of Search ............................. 280/731, 728.2, 280/730.1, 728.3

(56) References Cited

U.S. PATENT DOCUMENTS

| | | | |
|---|---|---|---|
| 3,618,979 A | * 11/1971 | Gulette | 280/731 |
| 4,101,146 A | * 7/1978 | Oehm | 280/731 |
| 4,449,728 A | 5/1984 | Pilatzki | |
| 5,174,599 A | 12/1992 | Hull et al. | |
| 5,560,648 A | * 10/1996 | Rhule et al. | 280/731 |
| 5,569,893 A | 10/1996 | Seymour | |

* cited by examiner

*Primary Examiner*—Peter C. English
(74) *Attorney, Agent, or Firm*—Tarolli, Sundheim, Covell, Tummino & Szabo L.L.P.

(57) ABSTRACT

A vehicle occupant protection apparatus (10) comprises a steering column (18) of a vehicle (12) and a vehicle steering wheel (14). The steering wheel (14) comprises a hub (16), a rim (22), and at least one spoke (24) extending from the hub to the rim. The steering wheel hub (16) supports the steering wheel (14) on the steering column (18) for rotation about an axis (20). The spoke (24) moves through a path of movement (30) as the steering wheel (14) rotates about the axis (20). The apparatus (10) further comprises an inflatable vehicle occupant protection device (44) having a deflated condition and an inflated condition. The protection device (44) is supported below the spoke (24) and for rotation with the steering wheel (14) about the axis (20). The protection device (44) is inflatable through the path of movement (30) of the spoke (24) to an inflated condition to help protect a driver of the vehicle (12).

6 Claims, 3 Drawing Sheets

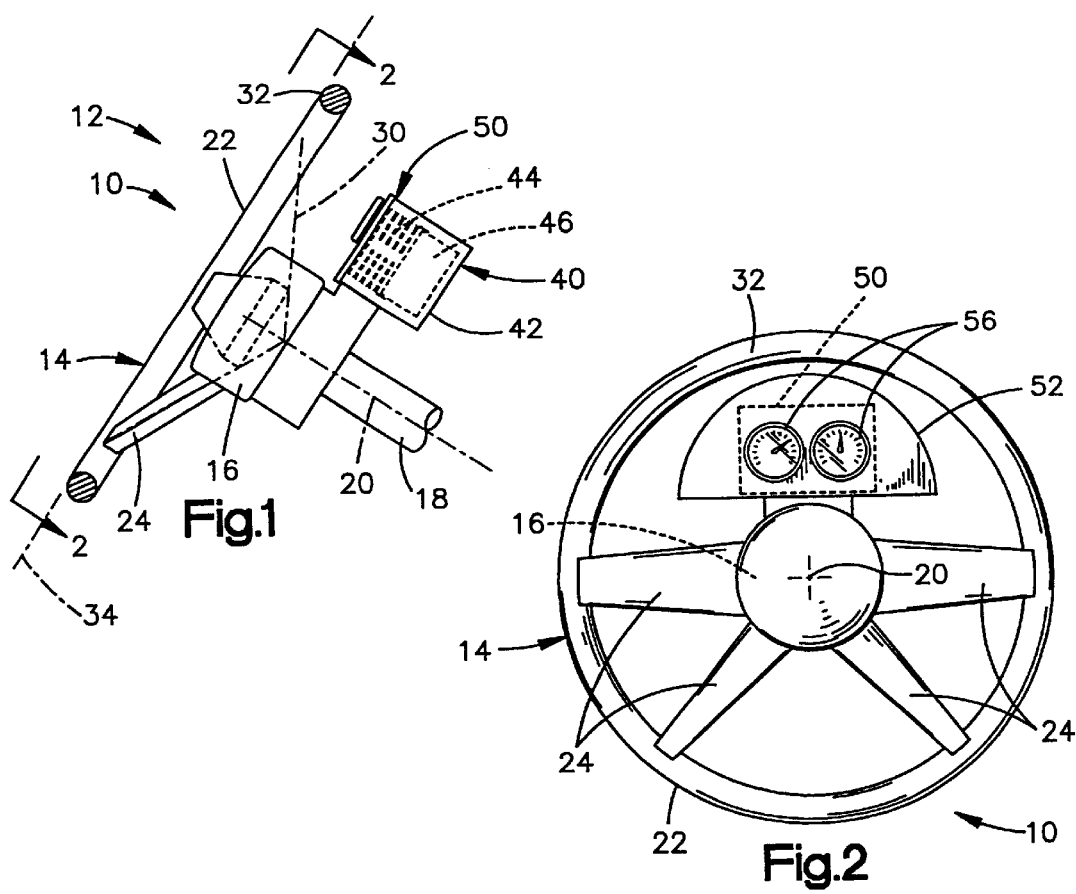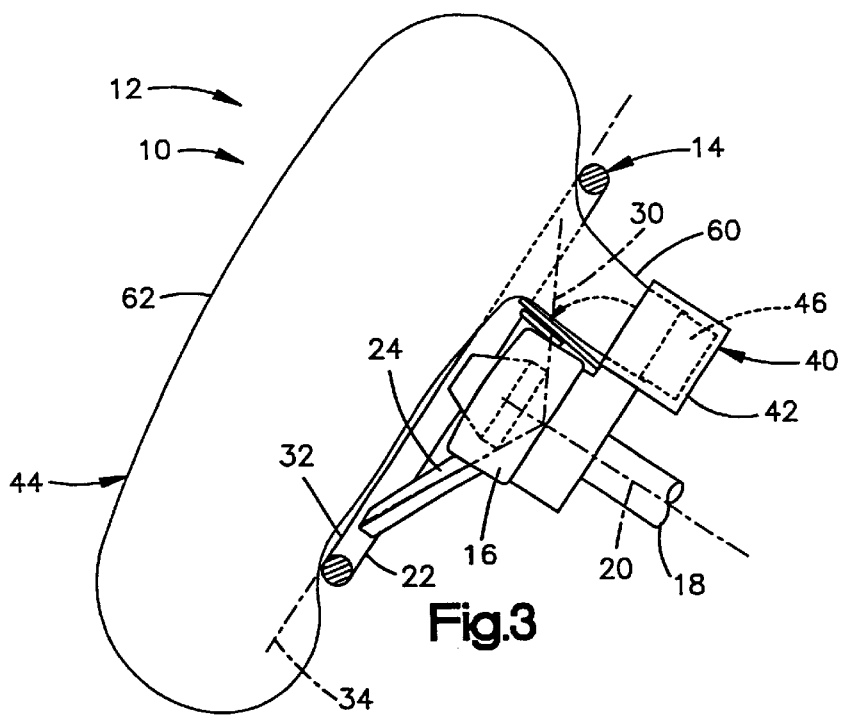

STEERING WHEEL AIR BAG MODULE

BACKGROUND OF THE INVENTION

1. Technical Field

The present invention relates to a vehicle occupant protection apparatus. In particular, the present invention relates to an air bag module including a door that opens to enable inflation of an air bag into a position to help protect a vehicle occupant.

2. Description of the Prior Art

A known vehicle occupant protection apparatus includes an air bag module located on a steering wheel of the vehicle. The air bag module includes an air bag mounted behind a cover in which a deployment door is formed. The air bag, when inflated, pushes the door open and inflates into a position to help protect the driver of the vehicle. The module is typically located in the center of the steering wheel. Thus, when the door opens, it may contact a vehicle driver.

SUMMARY OF THE INVENTION

The present invention is an apparatus comprising a steering column of a vehicle. The apparatus also comprises a vehicle steering wheel comprising a hub, a rim, and at least one spoke extending from the hub to the rim. The steering wheel hub supports the steering wheel on the steering column for rotation about an axis. The spoke moves through a path of movement as the steering wheel rotates about the axis. The apparatus further comprises an inflatable vehicle occupant protection device having a deflated condition and an inflated condition. The protection device is supported below the one spoke and for rotation with the steering wheel about the axis. The protection device is inflatable through the path of movement of the one spoke to an inflated condition to help protect a driver of the vehicle.

BRIEF DESCRIPTION OF THE DRAWINGS

Further features of the present invention will become apparent to those skilled in the art to which the present invention relates from reading the following specification with reference to the accompanying drawings, in which:

FIG. 1 is a side elevational view of an apparatus constructed in accordance with the present invention, shown in an unactuated condition;

FIG. 2 is a plan view taken along line 2—2 of FIG. 1;

FIG. 3 is a view similar to FIG. 1 showing the apparatus of FIG. 1 in an actuated condition;

DETAILED DESCRIPTION OF EMBODIMENTS OF THE INVENTION

Figure 5:
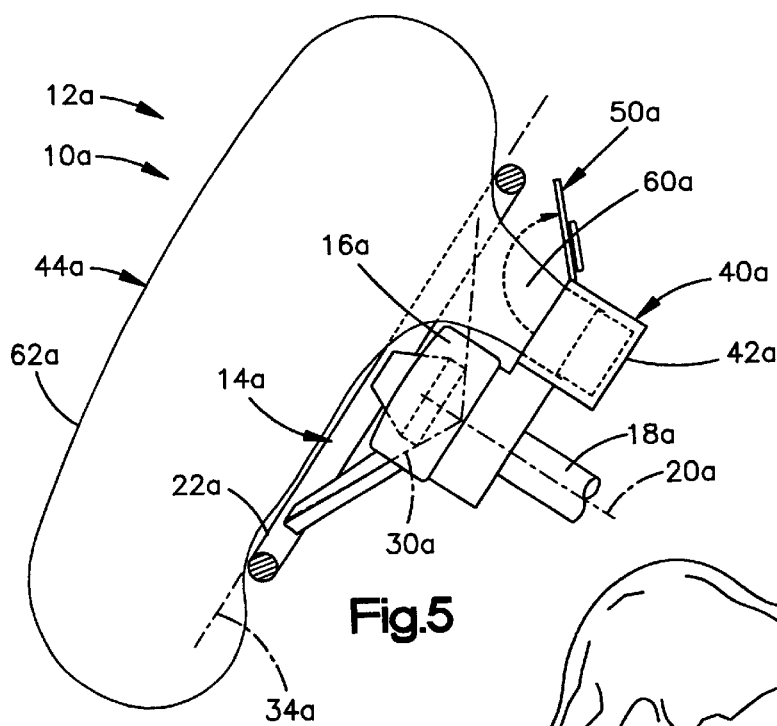
FIG. 5 is a side view partially in section of an apparatus constructed in accordance with a second embodiment of the invention.

The present invention relates to a vehicle occupant protection apparatus. In particular, the present invention relates to an apparatus for helping to protect a vehicle occupant. As representative of the present invention, FIG. 1 illustrates schematically an apparatus 10 for helping to protect a driver of a vehicle 12.

The vehicle 12 includes a steering wheel 14. The steering wheel 14 has a hub 16 connected with a steering column 18. The hub 16 supports the steering wheel 14 on the steering column 18 for rotation about an axis 20. The steering wheel 14 has a generally circular rim 22. The steering wheel 14 includes a plurality of spokes 24, which extend from the hub 16 to the rim 22.

The steering wheel 14 is rotatable about the axis 20 by the driver of the vehicle 12, to effect steering movement of the vehicle. As the steering wheel 14 rotates about the axis 20, the spokes 24 move through a path of movement indicated by the dashed lines 30. The rearward surface 32 of the rim 22 of the steering wheel 14 rotates in a plane 34 that does not extend through the hub 16. Thus, the path of movement 30 of the spokes 24 of the illustrated steering wheel 14 has a generally frustoconical configuration. For a steering wheel having spokes that rotate in a plane, the path of movement of the spokes would have a planar configuration.

The vehicle 12 includes an air bag module 40. The module 40 includes a housing 42. The housing 42 is supported on the steering column 18 for rotation with the steering wheel 14 about the axis 20. The housing 42 may be supported either directly on the steering column 18, as shown, or on the steering wheel hub 16.

The module 40 includes an air bag 44 and an inflator 46 located in the housing 42. The air bag 44 is shown schematically in FIG. 1 in a deflated, stored, condition. The air bag 44 is inflatable from the deflated condition shown in FIG. 1 to an inflated condition shown in FIG. 3 by inflation fluid from the inflator 46.

The module 40 includes a deployment door 50. The deployment door 50 is supported on the housing 42 for pivotal movement relative to the housing. The deployment door 50 covers the air bag 44 when the air bag is in the deflated condition. As illustrated in FIGS. 1 and 2, the deployment door 50 is part of a panel 52 including a plurality of vehicle instruments 56.

As noted above, the housing 42 is rotatable with the steering wheel 14 about the axis 20. Therefore, the air bag 44 and the inflator 46 and the deployment door 50 are also rotatable with the steering wheel 14 about the axis 20.

The air bag module 40 is located below the spokes 24 of the steering wheel 14 and below the path of movement 30 of the spokes. Specifically, the path of movement 30 of the spokes 24 is located between the driver of the vehicle and the air bag module 40. A mounting portion 60 of the air bag 44, connected with the housing 42, is disposed below the path of movement 30 of the spokes 24.

The deployment door 50, when in the closed condition shown in FIG. 1, is located below the path of movement 30 of the spokes 24. In addition, the deployment door 50 is located below the plane of rotation 34 of the steering wheel rim 22. That is, the plane of rotation 34 of the steering wheel rim 22 is located between the vehicle driver and the deployment door 50.

In the event of a vehicle collision for which protection of the driver is desired, the inflator 46 is actuated in a known manner to direct inflation fluid into the air bag 44. The air bag 44 begins to inflate within the housing 42. The inflating air bag 44 opens the deployment door 50. The deployment door 50 pivots forward and downward, toward the steering wheel hub 16, to enable the air bag 44 to inflate out of the housing 42.

The deployment door 50, as it pivots, moves from the closed condition covering the air bag 44, as shown in FIG. 1, to an open condition as shown in FIG. 3. When the deployment door 50 is in the open condition, it is still below the plane of rotation 34 of the steering wheel rim 22. As a result, the deployment door 50 is less likely to be contacted by the vehicle driver, than if it were partially or completely above the plane of rotation 34 of the steering wheel rim 22.

The air bag 44 inflates to an inflated condition to help protect the driver of the vehicle. As the air bag 44 inflates, it moves through the path of movement 30 of the pokes 24, from its deflated condition below the path of movement of the spokes to an inflated condition located at least partially above the path of movement of the spokes. When the air bag 44 is inflated, the mounting portion 60 of the air bag 44, connected with the housing 42, is disposed below the path of movement 30 of the spokes 24. An occupant contact portion 62 of the air bag 44 is disposed above the path of movement 30 of the spokes 24. The occupant contact portion 62 of the air bag 44 is engageable by the vehicle driver to help protect the driver.

Figure 4:
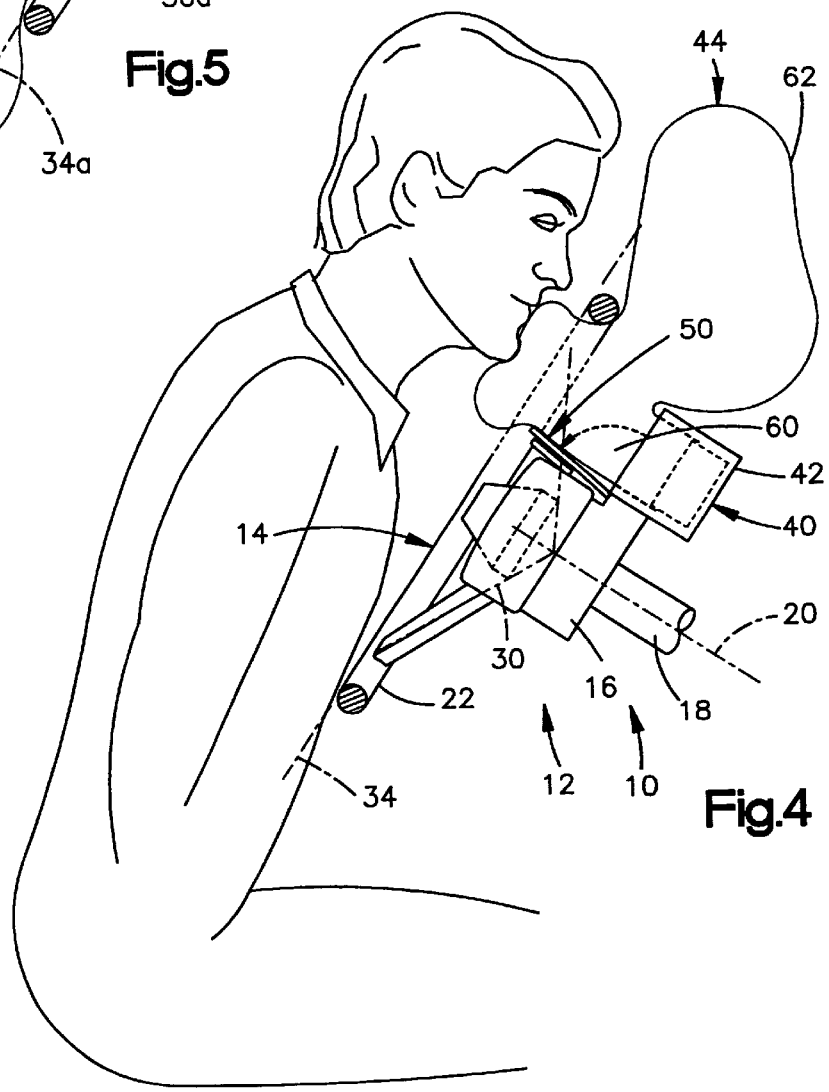
FIG. 4 is a view similar to FIG. 3 also showing the apparatus of FIG. 1 in an actuated condition.

It may happen that the vehicle driver, when the air bag 44 is inflated, is against or close to the steering wheel. If the driver is against or close to the steering wheel 14, the inflating air bag 44, after it initially contacts the driver, may be redirected away from the driver, that is, as shown in FIG. 4. This redirection of the air bag 44, to a location further behind the steering wheel 14, can occur because the air bag module 40 is located below the plane of rotation 34 of the steering wheel rim 22. This redirection of the inflating air bag, 44 can help to lessen the amount of force transmitted to the driver.

FIG. 5 illustrates a vehicle occupant protection apparatus 10a constructed in accordance with a second embodiment of the invention. The occupant protection apparatus 10a is similar to the apparatus 10 (FIGS. 1–4), and parts which are the same are given the same reference numerals with the suffix "a" added to distinguish them.

The occupant protection apparatus 10a includes a deployment door 50a which pivots in the opposite direction from the deployment door 50. Specifically, the deployment door 50a pivots upward and rearward, as shown in FIG. 5, away from the steering wheel hub 16a. In this position, there is little likelihood that the driver of the vehicle 12a will contact the deployment door 50a when it is in the open condition shown in FIG. 5.

Figure 6:
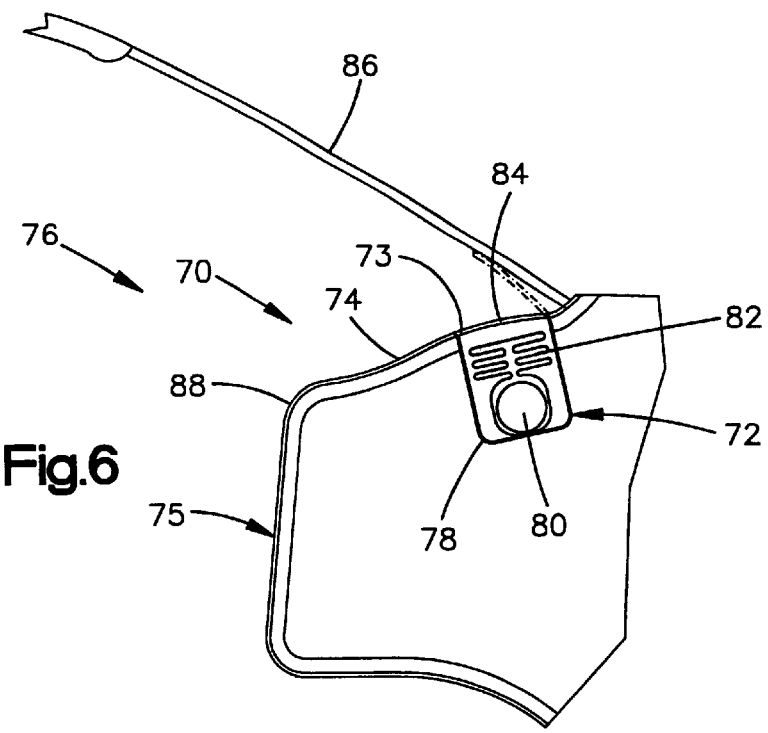
FIG. 6 is a side view of an apparatus constructed in accordance with a third embodiment of the invention.

FIG. 6 illustrates a vehicle occupant protection apparatus 70 constructed in accordance with a third embodiment of the invention. The vehicle occupant protection apparatus 70 includes a passenger side air bag module 72 mounted in an instrument panel 75 of a vehicle 76. The module 72 is mounted behind a deployment opening 73 in a trim pad 74 of the instrument panel 75. The air bag module 72 includes a housing 78 which contains an inflator 80 and an air bag 82.

The vehicle occupant protection apparatus 70 also includes a deployment door 84. The deployment door 84 is supported on the instrument panel 75 for pivotal movement between a closed condition (shown in solid lines in FIG. 6) closing the deployment opening 73, and an open condition (shown in dot-dash lines in FIG. 6) enabling inflation of the air bag 82 through the deployment opening.

The deployment door 84 is located very close to the base of the windshield 86 of the vehicle 76, and far forward of the rearward edge portion 88 of the instrument panel 75. As a result, the deployment door 84 is unlikely to contact an occupant of the vehicle when moving from the closed condition to the open condition.

Figure 7:
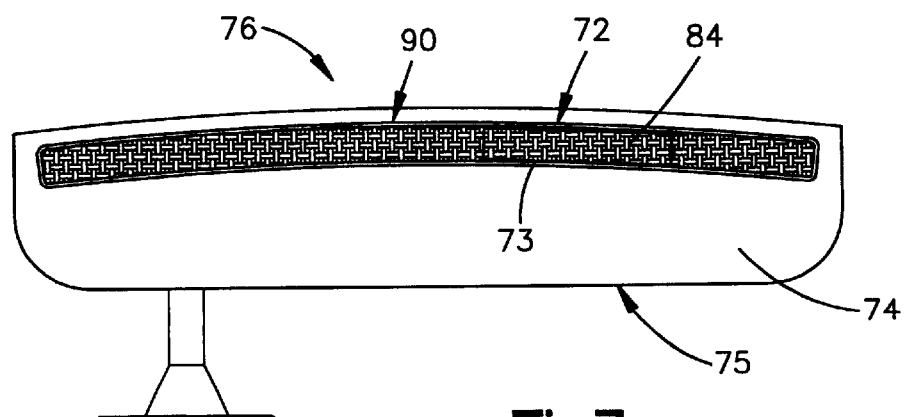
FIG. 7 is a top plan view of the apparatus of FIG. 6.

As can be seen in FIG. 7, the deployment door 84 is configured to have the outward appearance of a portion of the vehicle's defroster vent 90 which is located in the instrument panel trim pad 74. Thus, the deployment door 84 can be hidden or disguised, to present a more decorative appearance to an occupant of the vehicle 76.

Figure 8:
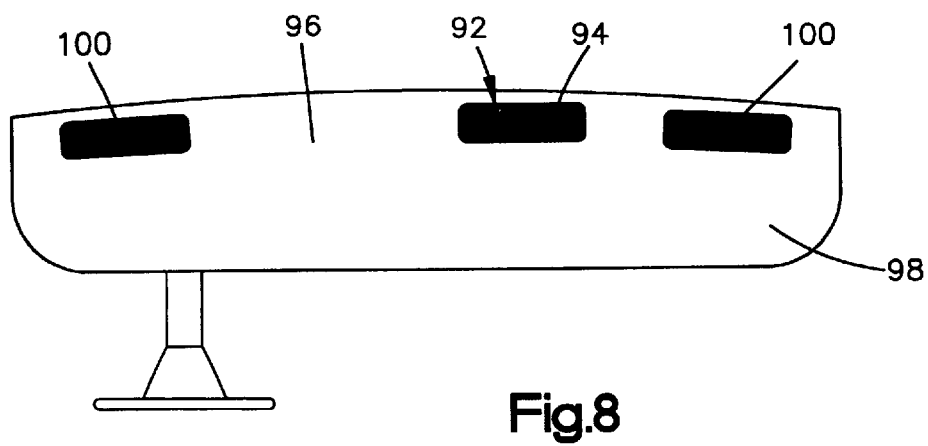
FIG. 8 is a view similar to FIG. 7 of an apparatus constructed in accordance with a fourth embodiment of the invention.

FIG. 8 illustrates a vehicle occupant protection apparatus 92 constructed in accordance with a fourth embodiment of the invention. The vehicle occupant protection apparatus 92 is similar to the vehicle occupant protection apparatus 70 of FIG. 7. In the vehicle occupant protection apparatus 92 of FIG. 8, the deployment door 94 is configured to have the outward appearance of a speaker grille mounted in an upper portion 96 of the vehicle instrument panel 98 along with genuine speaker grilles 100. Thus, the deployment door 94 can be hidden or disguised to present a more decorative appearance to an occupant of the vehicle.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus comprising:

a steering column of a vehicle;

a vehicle steering wheel comprising a hub, a rim, and at least one spoke extending from said hub to said rim, said steering wheel hub supporting said steering wheel on said steering column for rotation about an axis, said at least one spoke moving through a path of movement as said steering wheel rotates about said axis;

an inflatable vehicle occupant protection device having a deflated condition and an inflated condition, said protection device being supported below said spoke and for rotation with said steering wheel about said axis, said protection device being inflatable through the path of movement of said at least one spoke to an inflated condition to help protect a driver of the vehicle; and a door having a closed condition covering said protection device when said protection device is in the deflated condition, said door being movable from the closed condition to an open condition in response to inflation of said protection device, said door being supported below said and below the path of movement of said spoke.

2. An apparatus as set forth in claim 1 wherein said inflatable vehicle occupant protection device has a mounting portion connected with said steering wheel and an occupant contact portion extending from said mounting portion;

said protection device having a deflated, stored condition in which said mounting portion and said occupant contact portion of said protection device are both located on a first side of the path of movement of said spoke;

said mounting portion of said protection device being located on said first side of the path of movement of said spoke, and said occupant contact portion being located on a second side of the path of movement of said spoke, when said protection device is in the inflated condition.

3. An apparatus as set forth in claim 1 wherein said protection device is supported on said steering wheel for rotation with said steering wheel.

4. An apparatus as set forth in claim 1 wherein said door when in the open condition is below said spoke and below the path of movement of said spoke.

5. An apparatus as set forth in claim 4 wherein said door is supported for pivotal movement.

6. An apparatus comprising:

a steering column of a vehicle;

a vehicle steering wheel comprising a hub, a rim, and at least one spoke extending from said hub to said rim;

said steering wheel hub supporting said steering wheel on said steering column for rotation about an axis, said at least one spoke moving through a path of movement as said steering wheel rotates about said axis; and an inflatable vehicle occupant protection device having a deflated condition and an inflated condition, said protection device being supported below said spoke on said steering column for rotation with said steering wheel about said axis;

said protection device being inflatable through the path of movement of said at least one spoke to an inflated condition to help protect a driver of the vehicle.

* * * * *